(12) United States Patent
Rauenzahn et al.

(10) Patent No.: US 8,645,859 B2
(45) Date of Patent: Feb. 4, 2014

(54) SLIDING STACKS

(75) Inventors: Jade F. Rauenzahn, Santa Clara, CA (US); Katherine Long, Santa Clara, CA (US); Jeffrey D. Tyson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 301 days.

(21) Appl. No.: 13/070,400

(22) Filed: Mar. 23, 2011

(65) Prior Publication Data

US 2012/0246593 A1    Sep. 27, 2012

(51) Int. Cl.
*G06F 15/00*    (2006.01)
*G06F 13/00*    (2006.01)

(52) U.S. Cl.
USPC .......................................... 715/784; 715/786

(58) Field of Classification Search
USPC ................. 715/763–765, 784–788, 780–783
See application file for complete search history.

(56) References Cited

U.S. PATENT DOCUMENTS

| | | | |
|---|---|---|---|
| 6,204,846 B1 * | 3/2001 | Little et al. .................... | 715/784 |
| 6,850,255 B2 * | 2/2005 | Muschetto .................... | 715/788 |
| 7,934,167 B2 * | 4/2011 | Happonen .................... | 715/786 |
| 8,245,152 B2 * | 8/2012 | Brunner et al. ............... | 715/784 |
| 2008/0307343 A1 * | 12/2008 | Robert et al. ................. | 715/765 |

* cited by examiner

*Primary Examiner* — Cao "Kevin" Nguyen
(74) *Attorney, Agent, or Firm* — Novak Druce Connolly Bove + Quigg LLP

(57) ABSTRACT

A method generating section dividers that remain visible when the section to which they correspond has been scrolled off the display is provided. In a region displaying scrollable content, section dividers scroll with their corresponding section until the section divider reaches an edge of the display region. The section divider then becomes the new edge of the display region.

14 Claims, 9 Drawing Sheets

SLIDING STACKS

FIELD OF THE INVENTION

The present invention relates to navigating through scrollable content and, more specifically, to section dividers that remain visible when the section to which they correspond has been scrolled off the display.

BACKGROUND

Frequently, the amount of space needed to display data exceeds the display area of the region in which the data is to be displayed. Consequently, techniques have been developed to allow users to "scroll" the contents of a region. A scroll operation that causes content of the region to move up is referred to herein as an "up-scrolling operation", even though on some devices up-scrolling is performed by pulling down the thumb of a scroll bar. During an up-scrolling operation, the content that is currently at the top of the display region scrolls out of the region (and is therefore no longer visible), and content that was previously not visible scrolls into the display region from the bottom of the display region. Conversely, a scroll operation that causes content of the region to move down is referred to herein as a down-scrolling operation. During a down-scrolling operation, previously undisplayed content enters the region from the top, and content scrolls out of the region at the bottom.

In addition to scrolling contents up and down within a region, scrolling can occur from left to right ("right-scrolling"), or from right to left ("left-scrolling"). During a left-scrolling operation, content enters the display region from the right, and leaves the display region from the left. Similarly, during a right-scrolling operation, content enters the display region from the left, and leaves the display region from the right.

For the purpose of explanation, any undisplayed content that logically resides above scrollable content that is currently visible in a display region is referred to herein as "hidden-above" content. Similarly, undisplayed content that logically resides below, left or right of the scrollable content that is currently visible in a display region is referred to respectively as "hidden-below", "hidden-left", and "hidden-right" content.

Frequently, a display region will have some content that does not scroll. For example, it is common for spreadsheets to have one of more header rows that stay fixed at the top of a display region, while the rest of the spreadsheet scrolls up and down. Using a fixed header in this manner is useful when the content in the header applies to all of the data in the spreadsheet. However, if the header information only applies to one section of the spreadsheet, keeping the header fixed at the top of the region can be confusing.

For example, a spreadsheet may have a first set of rows that contain employee information, and a second set of rows that contain purchase order information. The names of the fields that belong to the first set of rows will probably be different than the names of the fields that belong to the second set of rows. If a fixed header row lists the names of the fields of the first set of rows, the header row will be helpful while the first set of rows is displayed, but will cause confusion if the first set of rows is scrolled off the display region and only the second set of rows are visible.

To avoid the problem caused by fixed headers that only pertain to a subset of scrollable content, delayed-departure section headers have been developed. Delayed-departure section headers have three states: a scroll state, a fixed state, and a hidden-above state. A delayed departure header is in a scroll state when neither the header nor the section to which it corresponds is hidden-above. When in the scroll state, the delayed-departure header scrolls like any other scrollable content, in tandem with the section of data to which the delayed-departure header pertains.

A delayed-departure header is in the fixed state when the delayed departure header has reached to the top of the display region but not all of the section to which the header corresponds is hidden-above. When in the fixed state, the delayed-departure header remains fixed at the top of the display region. Thus, during an up-scrolling operation, a delayed-departure header's departure out of the top of a display region is "delayed" as long as any data from the section to which the delayed-departure header corresponds has not been up-scrolled out of the display region.

A delayed-departure section header is in the hidden-above state when all of the section to which the header corresponds is hidden-above. In the hidden-above state, the delayed-departure section header is not visible, and will remain hidden until a down-scrolling operation causes a portion of the section to which the header corresponds to scroll into the display region.

Delayed-departure section headers have been implemented in the "Contacts" and "Calendar" applications available on the iPad™ and iPhone™ devices available from Apple Inc. For example, in the Contacts application, contact names are listed alphabetically. Within the list, the names that start with each letter follow a section header that indicates the letter. For example, the names that start with "c" follow a section header with the letter "c", and the names that start with "d" follow a section header with the letter "d".

Because the headers are delayed-departure headers, the section header for "c" will not scroll off the top of the screen during an up-scroll operation until all of the names that start with "c" have been up-scrolled off the display. Similarly, the section header for "d" will not scroll off the top of the screen during an up-scroll operation until all of the names that start with "d" have been up-scrolled off the display. Consequently, the top of the Contacts screen will always have exactly one header row at the top, which will always be the header row of the letter of top-most visible contact name.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for implementing "sticky section dividers" within scrollable content. Sticky section dividers divide sections of scrollable content. Sticky section dividers have two modes: a stuck mode and a scrolling mode. In the scrolling mode, sticky section dividers scroll with their corresponding section until a scroll operation causes the sticky section divider to reach a "hard edge" of the display region.

When the sticky section divider reaches a "hard edge", the sticky section divider enters the "stuck" mode in which the sticky section divider remains fixed against the hard edge. The edge of the sticky section that reached the hard edge is referred to herein is the "stuck edge", while the edge opposite the stuck edge is referred to herein as the "interior edge".

According to one embodiment, upon entering the stuck mode, the interior edge of a sticky section divider becomes the new hard edge. Consequently, further scrolling may cause other sticky section dividers to stick to any number of already-stuck section dividers, thereby creating a stack of several sticky section dividers that are in the stuck mode.

According to one embodiment, sticky section dividers transition from the stuck mode to the scrolling mode when the entire section that corresponds to the sticky section divider has been scrolled into the display region from the hard edge to which the sticky section divider is stuck. In addition, activation of controls on a given sticky section divider, or on another sticky section divider, may cause the given sticky section divider to transition from the stuck mode to the scrolling mode, as shall be described in greater detail hereafter.

Edges of a region that do not cause sticky section dividers to enter the stuck mode are referred to herein as "soft edges". Embodiments that employ sticky section dividers may either have hard edges in both scrolling directions, or may have a hard edge in one scrolling direction, and a soft edge in the other scrolling direction. For example, an embodiment may have a hard edge on the top of a display region, and a soft edge on the bottom of the display region. In such an embodiment, up-scroll operations will cause sticky section dividers to stack up at the top of the display region, rather than become hidden-above. However, down-scroll operations will still cause sticky section dividers to scroll off the screen to become hidden-below.

Example System for Sliding Stacks

Figure 8:
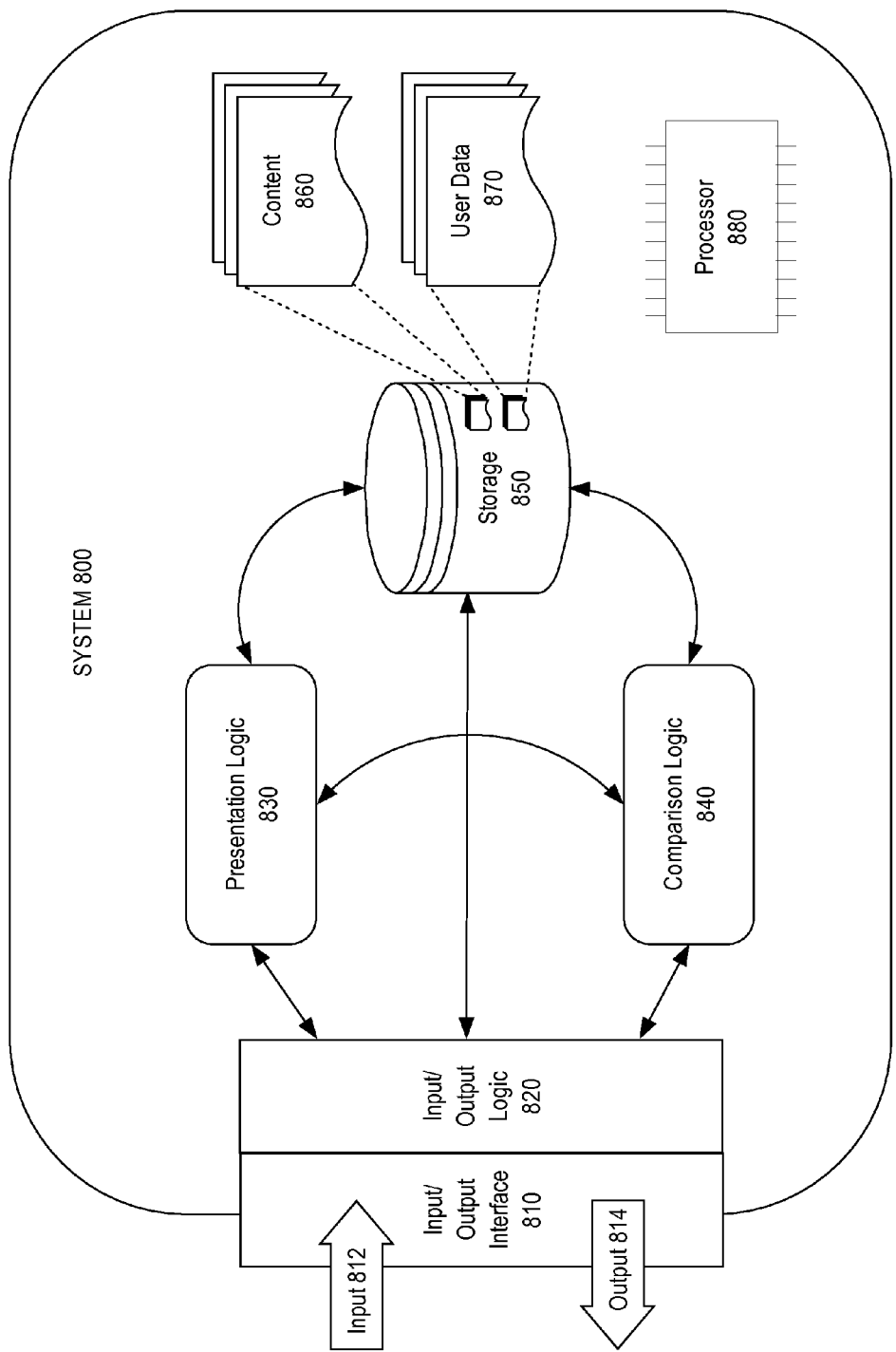
FIG. 8 represents a block diagram of an example system for sliding stacks.

FIG. 8 generally represents a block diagram of an example system for sliding stacks. In the example illustrated in FIG. 8, the system comprises an input/output (IO) interface 810, an IO logic 820, a presentation logic 830, a comparison logic 840, a storage 850, and a processor 880. An input 212 is received by the system 800 at an input/output (IO) interface 810. IO interface 810 may be any network interface such as a wireless network interface, Bluetooth network interface, or Ethernet-based interface. Input 812 may include data received from a personal computer, handheld device, smartphone, or other computing device. IO logic 820 is coupled to IO interface 810. IO logic is configured to parse and distribute incoming data and prepare output 814 for sending via IO interface 810, according to an embodiment. IO logic 820 may implement one or more communications protocols. IO logic 820 is coupled to presentation logic 830 and comparison logic 840 in an embodiment. IO logic 820 is also coupled to storage 850 in an embodiment. Storage 850 may be a database, and includes content table 860 and user data table 870 in an embodiment.

IO logic 820, presentation logic 830, comparison logic 840, and storage 850 are all coupled to a processor 880, which executes instructions provided by these elements of system 800. In an embodiment, presentation logic 830 and comparison logic 840 may be combined. Other elements of system 800 may also be combined. Comparison logic 840 generally represents logic for storing, retrieving, and determining content for side-by-side comparisons. Presentation logic 830 generally represents logic for presenting content, such as sticky dividers. For example, presentation logic 830 may display a content in a side-by-side comparison view using content defined by comparison logic 840.

In an embodiment, input 812 is a request to view a product comparison page. Input 812 is converted into a request message by IO logic 820 and delivered to comparison logic 840. Comparison logic 840 may retrieve a previously saved product comparison view instance or product instance from a user data database table 870, or a new comparison data from content database table 860 in storage 850 and provide the report to presentation logic 830. Presentation logic 830 produces a display view of the content 860 as output 814.

Presentation logic 830 may include one or more web servers, and may provide output 814 via a web interface. Presentation logic 830 generates instructions that are executed by a separate client device. The instructions define the movement and placement of elements in response to input detected at the client device in an embodiment. For example, the instructions generated by presentation logic 830 may instruct a client device to determine the placement of certain user-interface elements in response to a scrolling operation in a particular way.

In another embodiment input 812 is a request to view a listing of content 860 with section dividers. IO interface 810 is a keyboard, touchscreen, or other user interface that is coupled to system 800. Based on input 812, presentation logic 830 generates a display view that is displayed by a display device that is coupled to system 800, such as a computer monitor or touchscreen display. For example, input 812 may include an up-scrolling operation that scrolls all of the content in a particular content section off of the display view. The display view generated by presentation logic 830 may include the section divider for the content section for which no content is displayed.

Product Comparison Example

Figure 1:
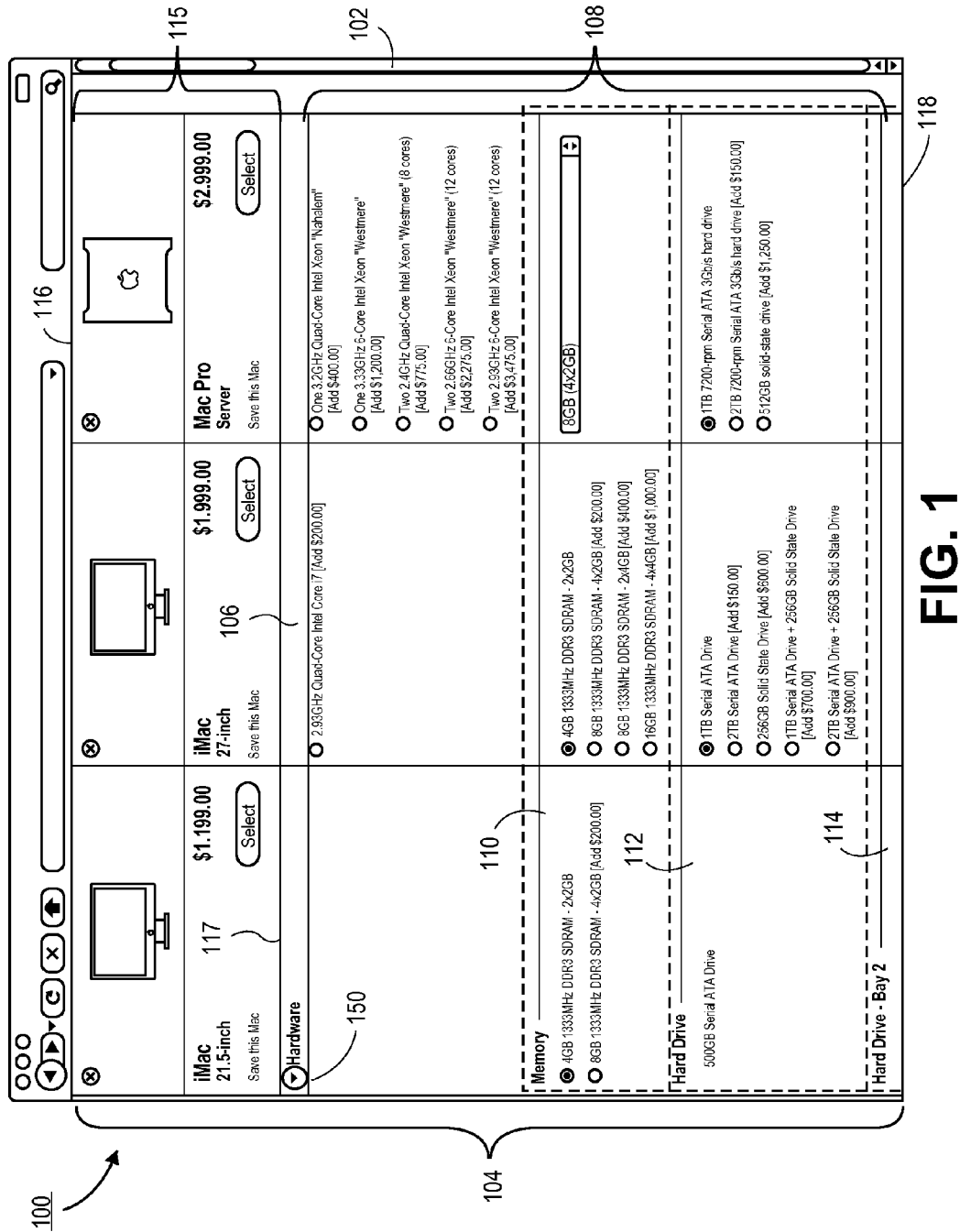
FIG. 1 illustrates a sticky divider in stuck mode, according to an embodiment of the invention.

Referring to FIG. 1, it illustrates how sticky section dividers may be implemented in the context of a side-by-side product comparison page 100. In the embodiment illustrated in FIG. 1, a portion of page 100 is generated by presentation logic 830 using information passed from comparison logic 840 and displayed in region 104. Because all of page 100 does not fit in region 104, region 104 includes a scroll bar 102 for scrolling page 100 along the vertical axis.

Because a mechanism is provided to scroll page 100, page 100 constitutes the scrollable content of region 104, which may be retrieved from content table 860 in storage 850. Scroll bar 102 is merely one example of a mechanism for scrolling scrollable content that does not entirely fit in a region. The techniques described herein may be used with any mechanism for scrolling, including but not limited to mechanisms that scroll in response to any type of dragging, touch-screen interaction, clicking and/or key pressing actions that generate input 812.

The following paragraphs describe functionality defined by instructions that are generated by presentation logic 830. Instructions generated by presentation logic 830 may be executed on system 800 or another system receiving the instructions in an embodiment.

Page 100 includes a plurality of sections that have sticky section dividers. In FIG. 1, product section 115 is sticky, and sticky section divider 106 is visible. Divider 106 contains the heading for the "Hardware" section 108. In the illustrated embodiment, the Hardware section 108 includes a plurality of sub-sections, including a subsection 110 for "Memory", a subsection 112 for "Hard Drive", and a subsection 114 for "Hard Drive—Bay 2". Hardware section 108 includes other sub-sections that are currently hidden-below region 104.

In the illustrated embodiment, the top edge 116 of region 104 has been designated a hard edge, while the bottom edge 118 of region 104 is a soft edge. Because edge 116 is a hard edge, and page 100 has been scrolled up to the point where the top edge of product section 115 has come into contact with top edge 116, product section 115 is in stuck mode, and bottom edge 117 of product section 115 has become a hard edge. Further, because sticky divider 106 has come into contact with edge 117, sticky divider 106 is in the stuck mode, and the bottom edge 120 of sticky divider 106 has become the new hard edge.

Figure 2:
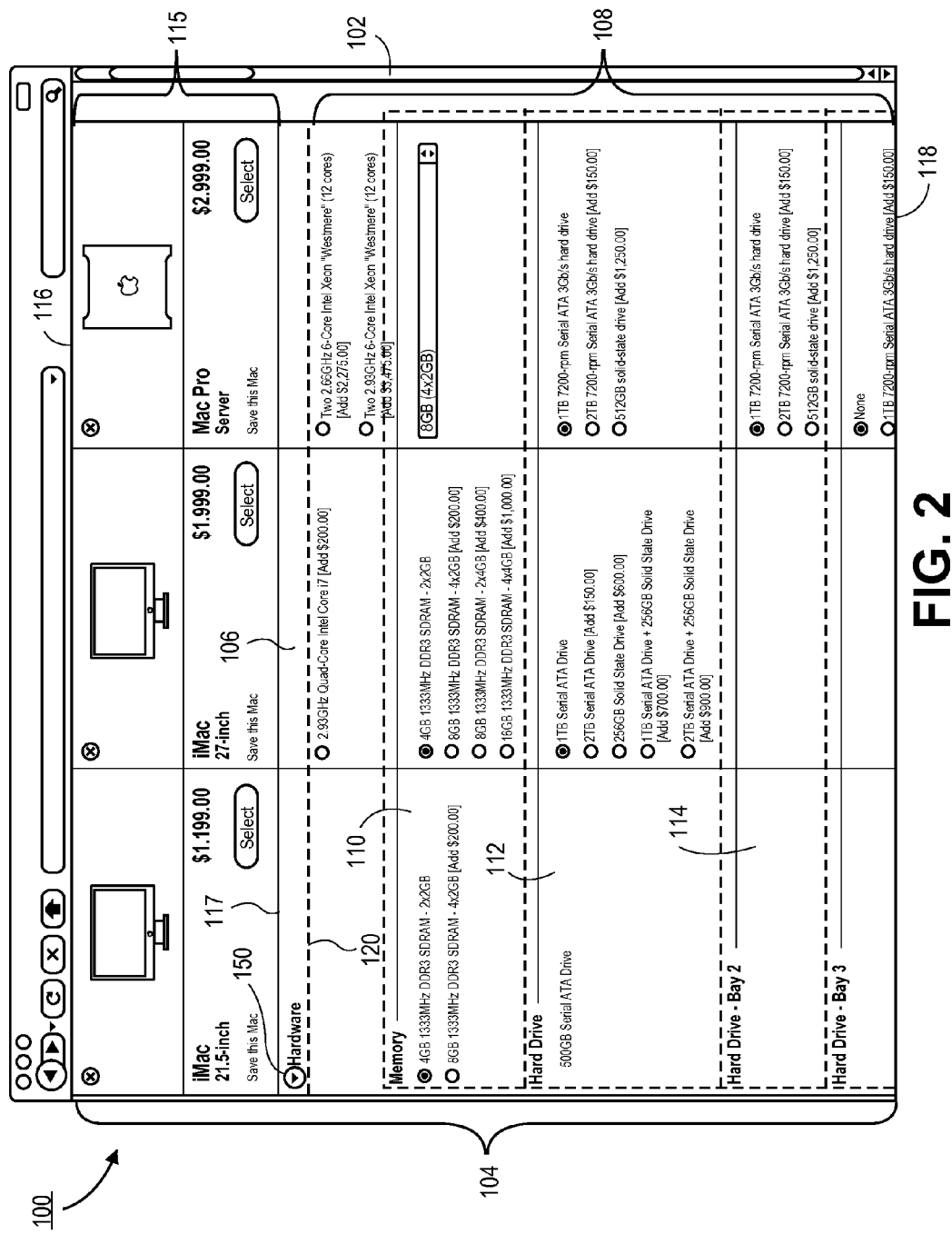
FIG. 2 illustrates how a sticky divider in stuck mode does not scroll in response to an operation that scrolls content in the direction of a hard edge to which the sticky divider is stuck.

FIG. 2 illustrates page 100 after a user has performed a scroll-up operation on page 100 illustrated in FIG. 1. In FIG. 2, sticky divider 106 remains in the stuck mode, and therefore continues to be visible, while the content of the section 108 has scrolled up.

Figure 3:
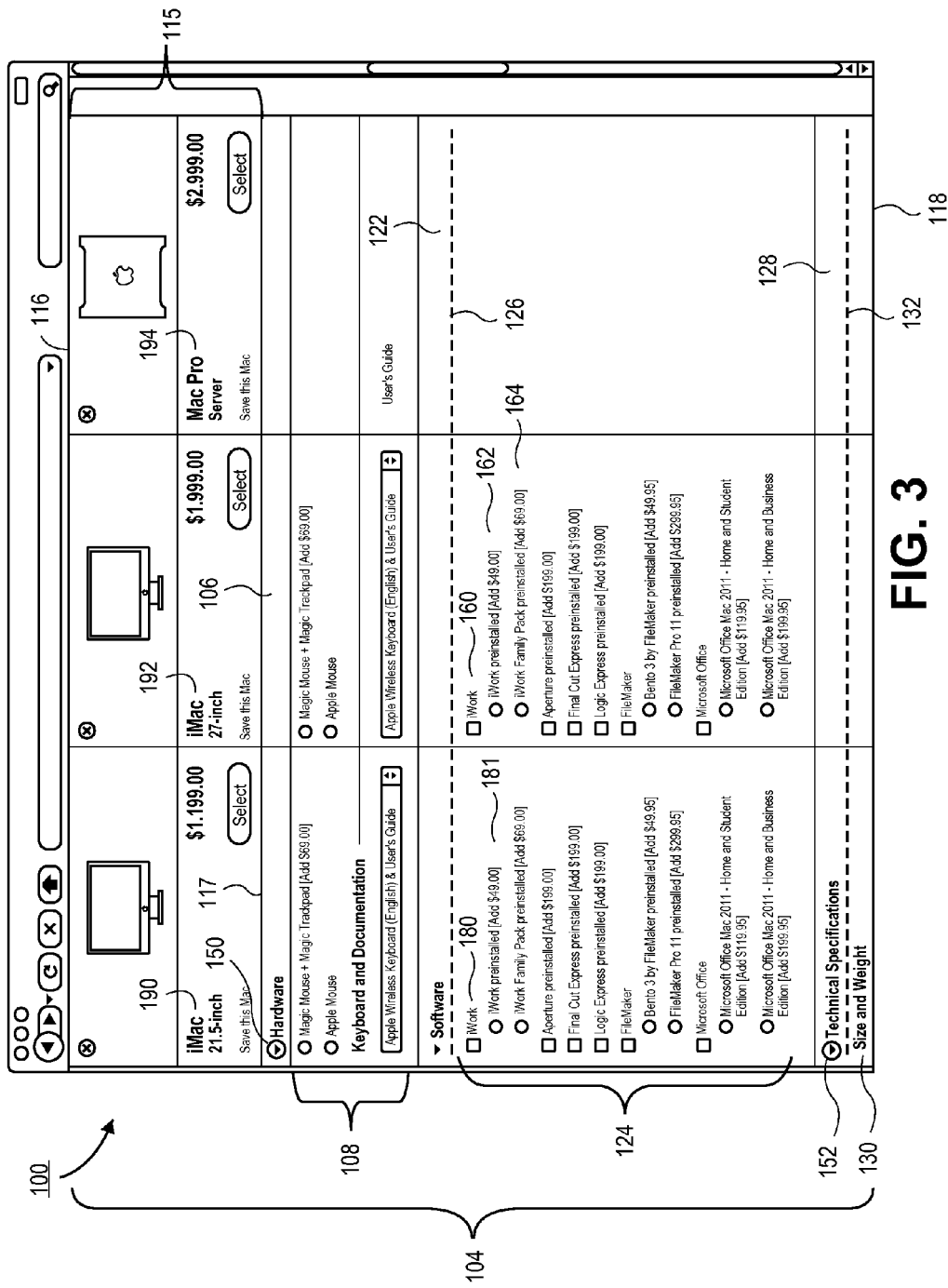
FIG. 3 illustrates a second sticky divider in scrolling mode while the first sticky divider is in stuck mode, according to an embodiment of the invention.

FIG. 3 illustrates page 100 after a user has performed a scroll-up operation on page 100 illustrated in FIG. 2. In FIG. 3, sticky divider 106 remains in the stuck mode, and therefore continues to be visible, while the content of the section 108 has scrolled up. In FIG. 3, page 100 has been scrolled up enough to cause a second sticky divider 122 to scroll into region 104. Sticky divider 122 is a header for a "Software" section 124. Because sticky divider 122 has not yet been scrolled up enough to make contact with the bottom edge 120 of sticky divider 106, sticky divider 122 remains in the scrolling-mode, and will scroll up and down along with the rest of the scrollable content of page 100.

Figure 4:
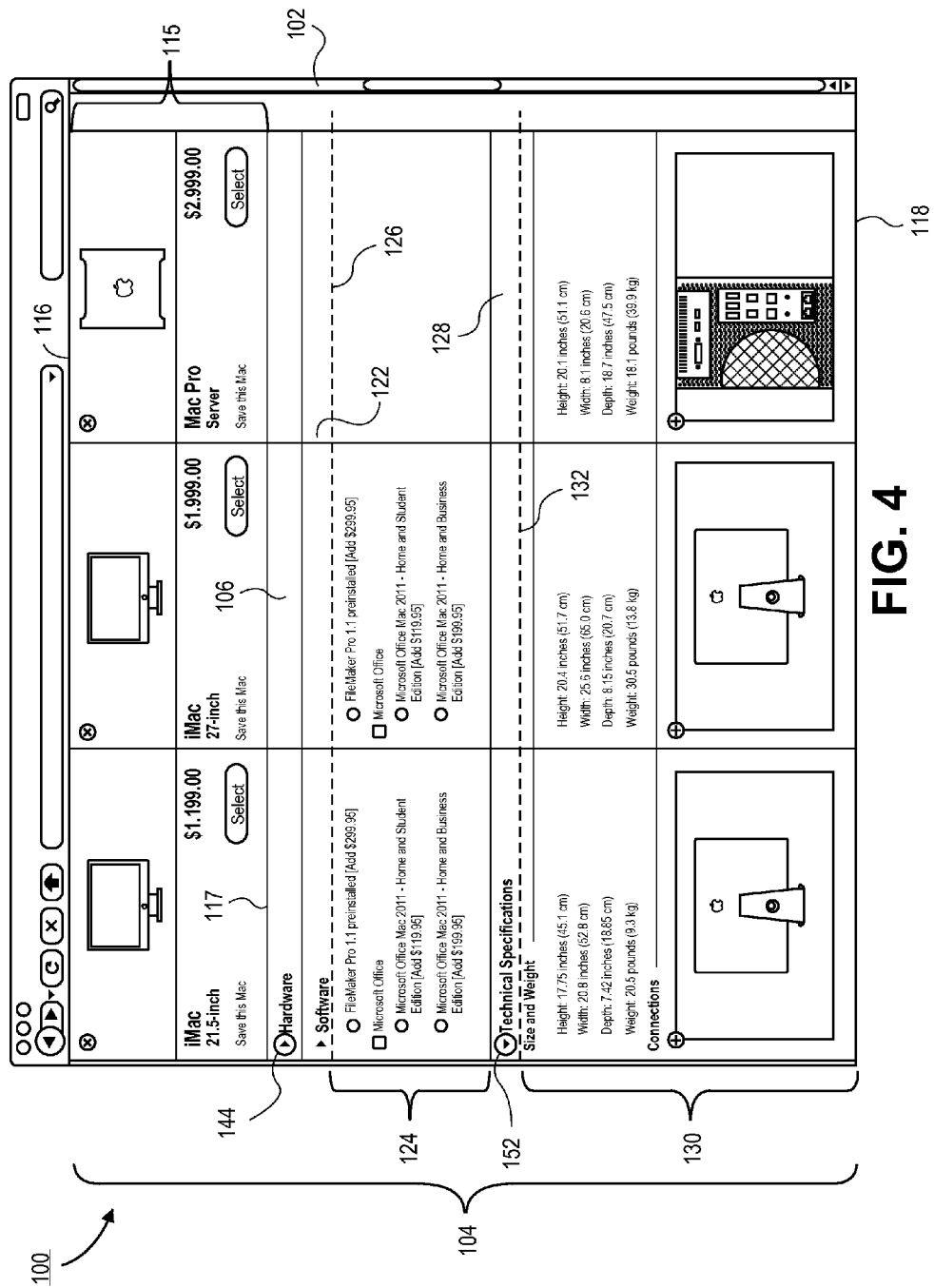
FIG. 4 illustrates the second sticky divider transitioning to stuck mode in response to being scrolled up to the bottom edge of the first sticky divider, according to an embodiment of the invention.

FIG. 4 illustrates page 100 after a user has performed a scroll-up operation on page 100 illustrated in FIG. 3. In FIG. 4, page 100 has been scrolled up enough to cause the upper edge of sticky divider 122 to contact the current hard edge (i.e. the bottom edge 120 of sticky divider 106). Consequently, sticky divider 122 transitions from the scrollable-mode to the stuck mode, and the bottom edge 126 of sticky divider 122 becomes the new hard edge. In the stuck mode, sticky divider 122 ceases to scroll up, and will only scroll down when page 100 has been scrolled down sufficiently that none of section 124 remains hidden-above.

In FIG. 4, a third sticky divider 128 has been scrolled up into region 104. Sticky divider 128 is the header for a "Technical Specifications" section 130. Because sticky divider 128 has not yet been scrolled up enough to the bottom edge 126 of sticky divider 122, sticky divider 128 remains in the scrolling-mode, and will scroll up and down along with the rest of the scrollable content of page 100.

Figure 5:
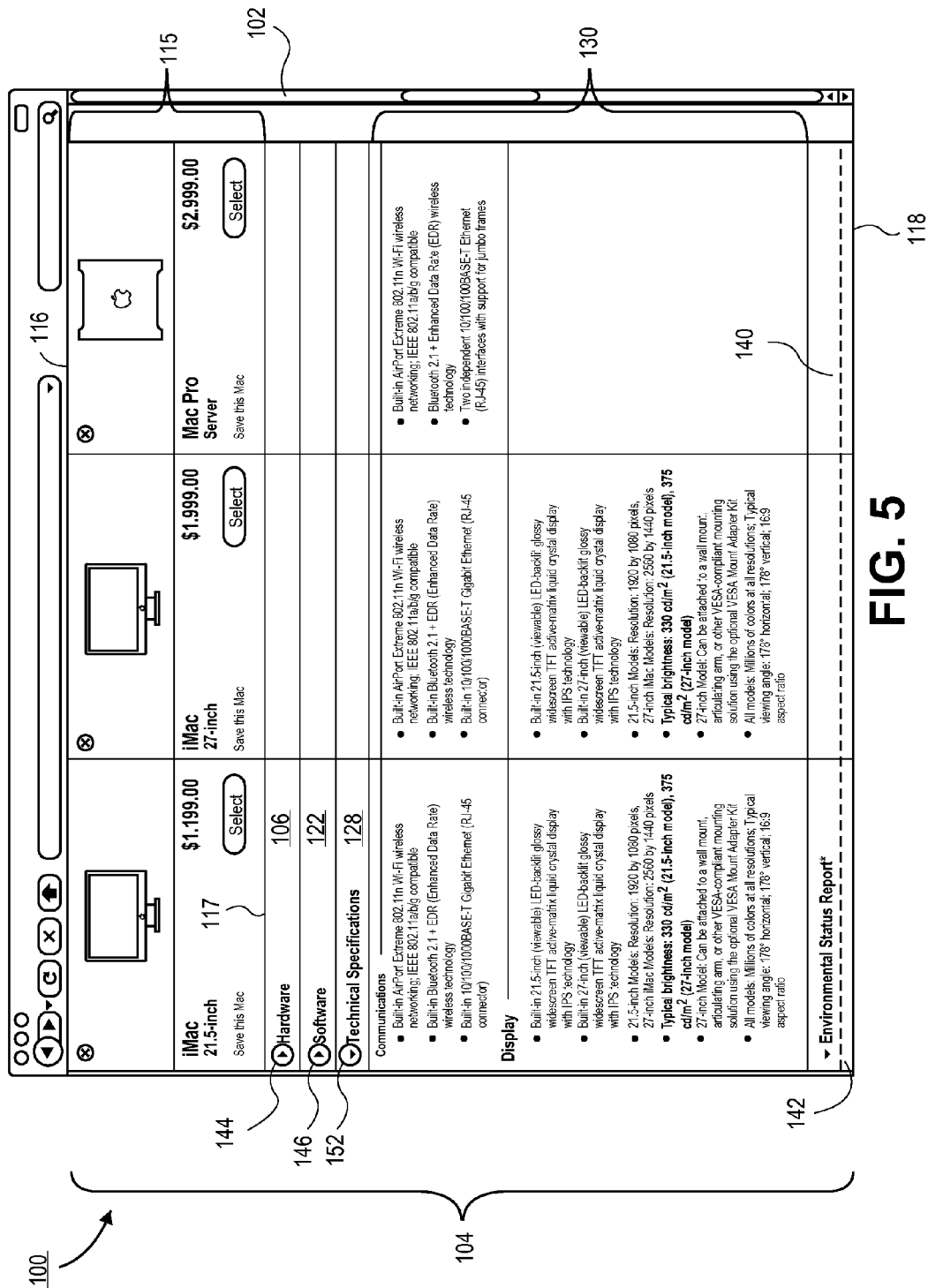
FIG. 5 illustrates a stack of three sticky dividers stuck to the hard edge of a display region.

FIG. 5 illustrates page 100 after a user has performed a scroll-up operation on page 100 illustrated in FIG. 4. In FIG. 5, page 100 has been scrolled up enough to cause the upper edge of sticky divider 128 to contact the current hard edge (i.e. the bottom edge 126 of sticky divider 122). Consequently, sticky divider 128 transitions from the scrollable-mode to the stuck mode, and the bottom edge 132 of sticky divider 128 becomes the new hard edge. In the stuck mode, sticky divider 128 ceases to scroll up, and will only scroll down when page 100 has been scrolled down sufficiently that none of section 130 remains hidden-above.

In FIG. 4, a fourth sticky divider 140 has been scrolled up into region 104. Sticky divider 140 is the header for a "Environmental Status Report" section 142 (currently hidden-below). Because sticky divider 140 has not yet been scrolled up enough to the bottom edge 132 of sticky divider 128, sticky divider 140 remains in the scrolling-mode, and will scroll up and down along with the rest of the scrollable content of page 100.

The sequence of actions described above in reference to FIGS. 1-5 illustrates how sticky dividers "stack up" along the hard edge of a region without scrolling past the hard edge. Unlike delayed-departure section headers, sticky dividers remain visible and stuck to a hard edge even when the entire section to which they correspond has been scrolled out of the region.

When scrolling toward a soft edge of a region, the sequence of events is reversed. For example, when a page is in the position illustrated in FIG. 4, a user may perform a scroll-down operation on the page. In response to the scroll-down operation, the stuck dividers 106, 122 and 128 will remain fixed until none of the Technical Specification section 130 remains hidden-above. In response to the last of section 130 being scrolled down into region 104, sticky divider 128 transitions from the stuck mode to the scrollable mode, and begins scrolling down with the rest of page 100, as illustrated in FIG. 4.

If the user continues to scroll down, sticky divider 122 will eventually transition from the stuck mode to the scrollable-mode (when none of section 124 remains hidden-above) and begin to scroll down, as illustrated in FIG. 3. Significantly, because the bottom edge 118 of region 104 is a soft edge, sticky dividers do not transition into the stuck mode when they reach bottom edge 118. Rather, the sticky dividers simply scroll down out of region 104 with the rest of the page, to become hidden-below until a scroll-up operation causes them to scroll back into region 104.

In an alternative embodiment, both top edge 116 and bottom edge 118 of region 104 may be hard edges. In such an embodiment, scroll-down operations would cause sticky dividers 106, 122, 128 and 140 to stack up at the bottom of region 104, while scroll-up operations cause the same sticky dividers to stack up at the top of region 104. In such an embodiment, the sticky dividers of a page would never be hidden. Consequently, a user would be able to interact with controls on any divider of page 100 without having to scroll the page 100.

Collapse and Expand Controls on Sticky Section Dividers

According to one embodiment, sticky dividers may contain controls that help users to navigate through the content of the sections to which the sticky dividers correspond, based on functionality defined by instructions that are generated by presentation logic 830. For example, one type of control to assist in navigating through content is a collapse and expand control. When the content of a section is visible, activating a collapse control on the sticky divider that corresponds to the section hides the content associated with the section, and causes the collapse control to become an expand control. When the content of a section is hidden, activating an expand control on the sticky divider that corresponds to the section causes the section to become visible.

In one embodiment, selecting the expand control of a particular sticky divider causes not only the section associated with the particular sticky divider to expand, but also automatically expands any other collapsed sections whose sticky dividers are between the particular sticky divider and the soft edge of the region. For example, in FIG. 5, section dividers 106 and 122 have expand controls 144 and 146 respectively because their respective sections have been scrolled off the hard edge 116 of region 104. In response to activation of the expand control 144 associated with section divider 106, both the section 108 associated with divider 106, and the section 124 associated with section 122, are expanded. In this example, section 124 is expanded because sticky divider 122 resides between the sticky divider 106 whose expand control was activated, and the soft edge 118 of the region 104.

Figure 6:
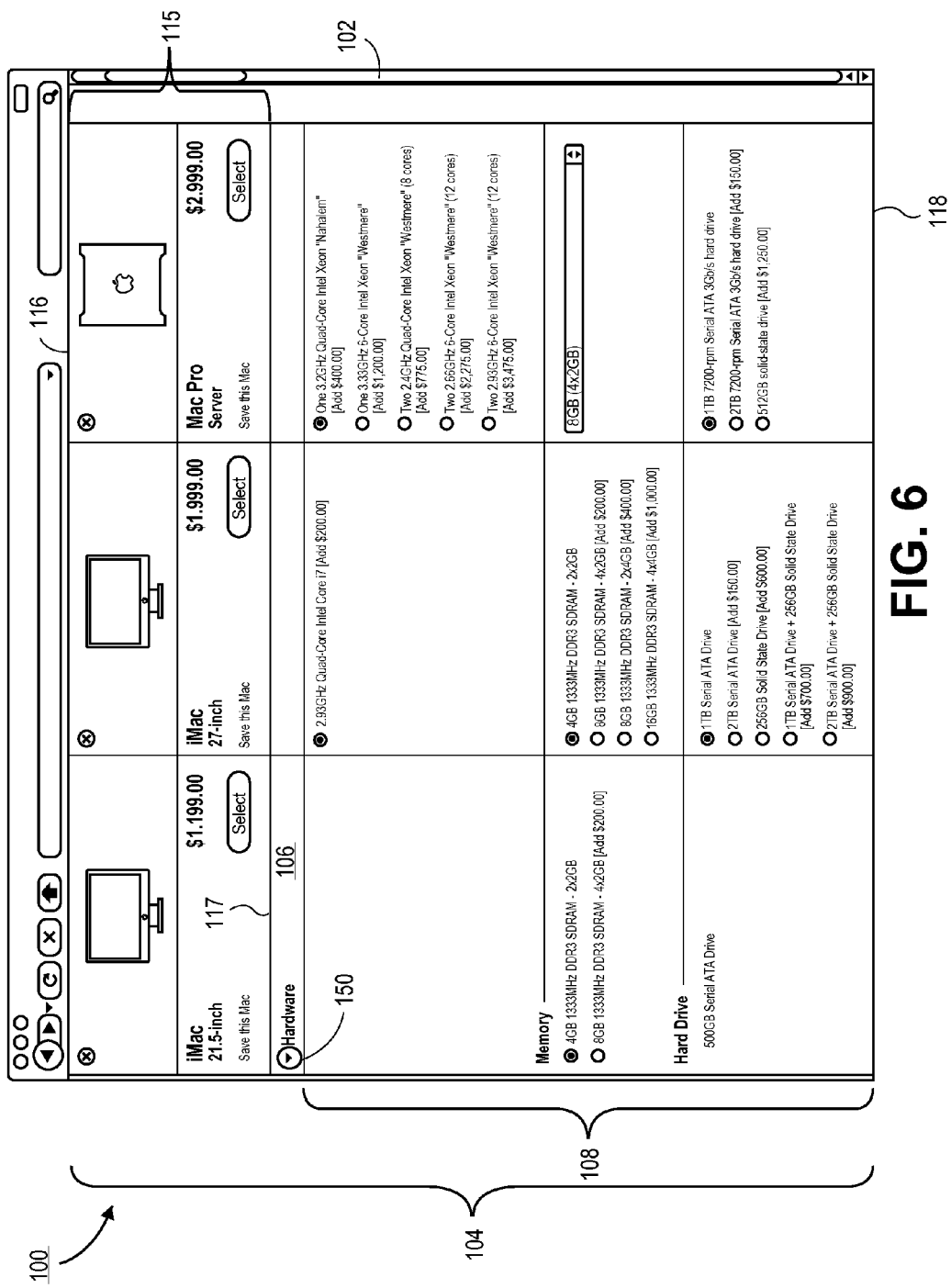
FIG. 6 illustrates the consequences of activating an expand control on a sticky divider that is in stuck mode.

In addition to expanding sections 108 and 124, activating expand control 114 causes page 100 to automatically be scrolled down to the point where none of the section 108 associated with sticky divider 106 whose control is activated remains hidden-above. FIG. 6 illustrates the result of activating the expand control of sticky divider 106 when page 100 is as illustrated in FIG. 5.

Referring to FIG. 6, both sections 108 and 124 have been expanded, and the application that is rendering page 100 has automatically scrolled page 100 down so that none of section 108 remains hidden-above. In the example shown in FIG. 6, section 108 is so large that the automatic scrolling of the page has scrolled all sections below section 108, including the sticky divider 122 of section 124, completely out of region 104. Activation of expand control 144 has also cause expand control to turn into a collapse control 150.

Referring again to FIG. 5, not all of the Technical Specification section 130 has been scrolled off the hard edge 116 of region 104. Consequently, the sticky divider 128 for the Technical Specification section 130 has a collapse control 152 rather than an expand control. In response to the entire section associated with a control scrolling off a hard edge of a region, the collapse control on the sticky divider for that section turns into an expand control. Thus, if a user were to scroll page 100 up until all of section 130 is hidden-above, collapse control 152 would become an expand control.

Product Reconfiguration on a Side-by-Side Comparison Display

According to one embodiment, the content for a section includes information for a side-by-side comparison of products, and sections are associated with categories. Sections may be divided into subsections. For example, the products being compared may be computers such as those manufactured and sold by Apple Inc. of Cupertino, Calif. One section, such as section 108, may be associated with the "hardware" category as shown in FIG. 1 while another section, such as section 124, may be associated with the "software" category as shown in FIG. 3.

Sections may be divided subsections that correspond to specific section/product combinations. Those subsections may be further divided into sub-subsections that correspond to specific subsection/product combinations. There is no limit to the number of levels into which sections may be subdivided. The term "product portion" is used herein to refer to the portion of a section that corresponds to a particular section/product combination, or a particular subsection/product combination (at any level).

Figure 7:
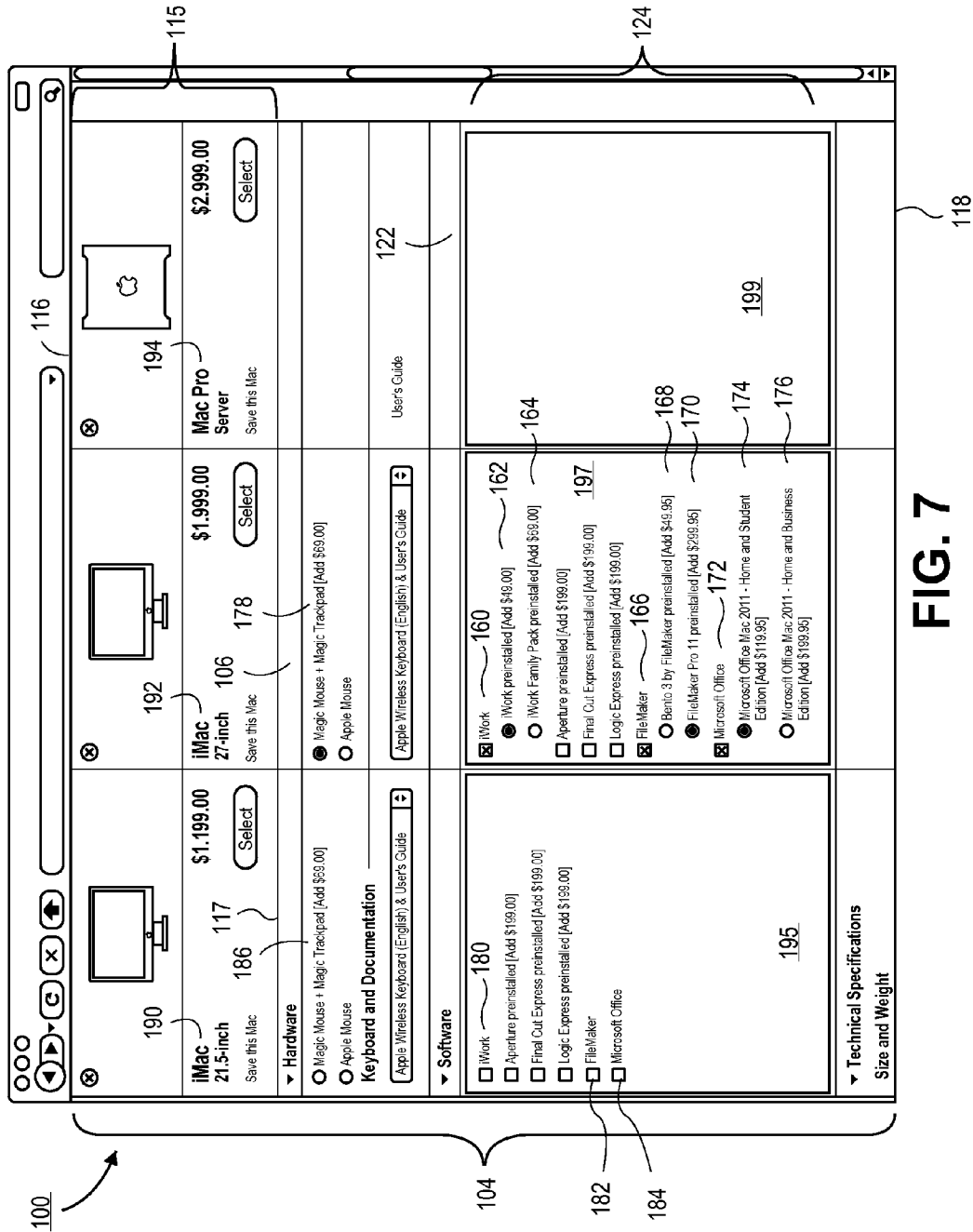
FIG. 7 illustrates the consequences of activating an option control that has dependent option controls.

Product portions contain information for the corresponding category (or subcategory) for the corresponding product. Referring to FIG. 7 for example, software section 124 may be divided into product portions 195, 197 and 199, each product portion having an association with a different product that is being compared, such as products 190, 192, and 194.

In an embodiment, some or all product portions include option controls that allow the options for a corresponding category to be changed for a corresponding product. For example, a product portion may include option controls for changing hardware or software options for a particular computer, such as an iMac. These option controls generate input 812 that is interpreted by comparison logic 840 in an embodiment. Comparison logic 840 may instruct presentation logic 830 to reconfigure page 100 to include user interface elements, content, and the results of calculations performed by comparison logic 840 in an embodiment.

According to one embodiment, options for one product in a side-by-side comparison display may be changed or updated (a) without navigating away from the side-by-side comparison, and (b) without any changes being made to options for other products. Using this technique, a user may select several products for comparison, and then change the configuration of each product within the comparison page without being bothered by pop-up windows, without losing configuration information for the products being compared, and without leaving the side-by-side product comparison page.

Referring to FIG. 3, option controls 160 and 162 may be selected, indicating that the user is requesting that the preinstalled iWork software be added to product 192 for comparison purposes. Without refreshing page 100, the price of product 192 is automatically updated to reflect the newly selected option. At the same time, option controls 180 and 181 are left unselected. In addition, the price for product 190 remains the same.

In another embodiment, selecting an option for a first product in a side-by-side comparison display may result in the automatic selection of an option for a second product in the side-by-side comparison display, as determined by comparison logic 840. For example, option control 178 may be selected, indicating that the user is requesting that the magic mouse and magic trackpad be added to product 192. In response to the selection of option control 178, option control 186 is also selected and the price of product 190 is updated to reflect the cost of the new option.

Option controls may be configured by comparison logic 840 to be mutually exclusive. For example, option control 162 and option control 164 may be configured to be mutually exclusive options. Option control 168 and option control 170 may be mutually exclusive, and option control 174 and option control 176 may be mutually exclusive. In an embodiment, an option control in one section is mutually exclusive with respect to an option control in another section or subsection.

In an embodiment, users select one or more products to compare. An instance of each product being compared is generated, and the state of each product instance is updated when an option is selected for that product instance. If a user wants to save a particular configuration from the comparison page, she may select a "save" control within page 100 to generate a copy of the product instance and associate the copy with a user profile. The user may retrieve the saved product and either purchase the product or compare it with other products.

In an embodiment, a comparison view may be saved by comparison logic 840 in the user data table 870 of storage 850 as a comparison view instance that includes each product instance in the comparison view. A comparison view instance may be retrieved by comparison logic 840 at a later time if the user intends to make additional changes or review the comparison at a different time or location.

Comparison view instances and saved product instances may be shared with others in an embodiment. Users may invite other users to view a comparison view instance or product instance by selecting a control that causes comparison logic to generate and send a URL to the invited user. The URL may include a reference to a product comparison view instance identifier or one or more product instance identifiers that uniquely identify, to comparison logic 840, a comparison view or one or more product instances. Comparison view instances and saved product instances may then be retrieved by directing a web browser to the URL. Other methods of sharing comparison view instances and saved product instances may also be used in an embodiment.

In an embodiment, a user may cause comparison logic 840 to generate a static view of a side-by-side comparison display. For example, the options currently selected for each product and the standard features of the product may be printed or stored in a digital document.

Size Reconfiguration on a Side-by-Side Comparison Display

FIG. 7 illustrates an embodiment of page 100 that includes expandable and collapsible option controls within the scrollable content based on functionality defined by instructions that are generated by presentation logic 830. Referring to FIG. 7, option controls 180, 182, and 184 are in "collapsed mode." When an option control is in "collapsed mode," option controls that are dependent on the collapsed option control, referred to herein as "dependent option controls," are hidden. In an embodiment, all dependent option controls are hidden, even if the dependency relationship with the collapsed option control is indirect. For example, control C may depend on option control B, which may depend on option control A. If option control A is in collapsed mode, then both option controls B and C are hidden in an embodiment.

In an embodiment, the selection of a control that has dependent option controls causes dependent option controls to be revealed without refreshing page 100. When an option control reveals dependent option controls, that option control is said to be in "expanded mode." Option controls 160, 166, and 172 are in expanded mode. In an embodiment, dependent option controls are visible only if they are directly dependent on an option control that is in expanded mode. For example, option control C may depend on option control B, which may depend on option control A. If option control A is in expanded mode, then option control B is visible. If option control B is also in expanded mode, then option control C is visible. If option control A is in expanded mode, but option control B is not, then option control B is visible and option control C is not.

In an embodiment, the size of the product portion in which the option control resides is dependent on the size requirements of the option controls in the corresponding section or subsection. As option controls transition from collapsed mode into expanded mode, the option controls in that product portion may exceed the size of the product portion in which the option controls are to be displayed.

For example, selecting option control 172 causes option control 172 to transition to expanded mode, revealing option controls 174 and 176. If the size of product portion 197 is not sufficient to contain additional option controls 174 and 176, then the product portion is expanded, without refreshing page 100, in order to accommodate the newly increased size requirements for the product portion. In an embodiment, the entire section or subsection corresponding to the product portion is expanded, thereby causing the expansion of other product portions in the section or subsection, which inherit the size requirements of the product portion in the section or subsection having the greatest requirements for space. The section has a uniform size, and the sections headers remain aligned across all product portions to present a uniform look and feel to the user.

In an embodiment, the expansion of an option control does not necessarily result in the expansion of a product portion. For example, the selection of option control 182 causes option control 182 to transition to expanded mode, thereby increasing the amount of space used by option controls in product portion 195. However, sufficient space for displaying the added option controls is already allocated for product portion 195 because the size requirements of product portion 197 have been inherited by product portion 195, which has greater space requirements than product portion 195.

As option controls transition from expanded mode into collapsed mode, the option controls in that product portion may require less space than the space currently allocated for the product portion. For example, if option control 166 were de-selected, product portion 197 would require less space. In this case, product portion 197 may be decreased in size without refreshing page 100. In an embodiment, the size is decreased to the maximum size required to display product portion 197. In an embodiment, the entire section or subsection corresponding to product portion 197 shrinks to conform to the size requirements of product portion 197, thereby shrinking other product portions in the section or subsection, which inherit the size requirements of product portion 197.

In an embodiment, the other product portions in the section or subsection inherit the size requirements of the product portion in the section or subsection having the greatest requirements for space. For example, a first product portion may require more space than a second product portion in the same section before a particular option control in the first product portion transitions from expanded mode to collapsed mode. If the second product portion requires more space than the first product portion and all other product portions in the section after the transition, then all product portions in the section or subsection will inherit the size requirements of the second product portion.

In an embodiment the transition of an option control from expanded mode into collapsed mode does not necessarily result in the decrease in the size of the product portion containing the collapsed option control. For example, a first product portion may require more space than a second product portion in the same section or subsection before a particular option control in the second product portion transitions from expanded mode to collapsed mode. If no other changes are made, then the second product portion will continue to require less space than the first product portion after the transition. Product portions in the section or subsection, which continue to inherit the size requirements of the product portion with the greatest size requirements, will not change in size; the collapsing option control was not contained in the product portion with the greatest size requirements.

In the embodiments discussed above, size requirements inherited by sections, subsections or product portions may be limited to size requirements associated with one axis. In other embodiments, other size requirements are inherited.

Any change in the size of a product portion or a section may cause the overall size of the scrollable content to change. The size change may cause some or all of the content to scroll. For example, when an option control such as option control 172 transitions from collapsed mode to expanded mode, the new content (option controls 174 and 176) is inserted at a location designated as the insertion point for that option control. The insertion point may be directly below the invoking option control 172, for example. The insertion of content may displace content in the same product portion, causing the displaced content to scroll away from the insertion point. If the insertion causes the expansion of the section having the insertion point, then an adjacent section may scroll away from the insertion point. For example, technical specification section 130 and any other section below technical specification section 130 may automatically scroll away from the insertion point, making room for the inserted content.

In an embodiment, the insertion of content does not cause content to scroll. For example, if option control 182 were expanded, software section 124 would not require a size increase to accommodate the additional option controls that would be inserted in response to the activation of option control 182 because the size allocated to the section would already be sufficient to handle the insertion of the additional option controls.

In an embodiment, the insertion of content causes the section in which the content was added to scroll toward the hard edge of a sticky divider that is in stuck mode. In response to the insertion of content as a result of the activation of one or more option controls, a particular sticky divider that is in scrolling-mode may scroll up enough so that the upper edge of the particular sticky divider contacts the hard edge. Consequently, the particular sticky divider transitions from scrollable-mode to stuck mode as a result of the activation of an option control.

In an embodiment, the insertion point may reside in a different section from the control that causes the insertion. For example, certain software may not be recommended or may not be available for computers that do not meet certain minimum hardware requirements. Therefore, the selection of an option control in the hardware section 108 that causes the system to meet the minimum requirements of a particular software package may cause an option control for that software package to be inserted in the software section 124. In addition, de-selecting an option control in hardware section 108 may result in the removal and de-selection of an option control associated with a software package in the software section 124 if the minimum requirements of the software package are no longer met because of the hardware change. When the selection of an option control in one section causes the size requirements of a second section to change due to the addition or removal of content, the second section will automatically adjust to the size required by the largest product portion in that section.

Optionally, newly available options may be highlighted to draw attention to the features made available by the selection of an option control. In an embodiment, the content may scroll away from the newly selected option, and focus on one or more options made available in response to the selection. In an embodiment, this may result in the selected option being scrolled out of the display area of the region, which may result in the section divider for the selected option's section transitioning to stuck mode. The current scroll position may be detected by using JavaScript and Cascading Style Sheets (CSS) or some other programming language. By setting the scroll position to the position of a particular section header, option control, or any other item in the scrollable content, the desired information may be displayed to the user.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
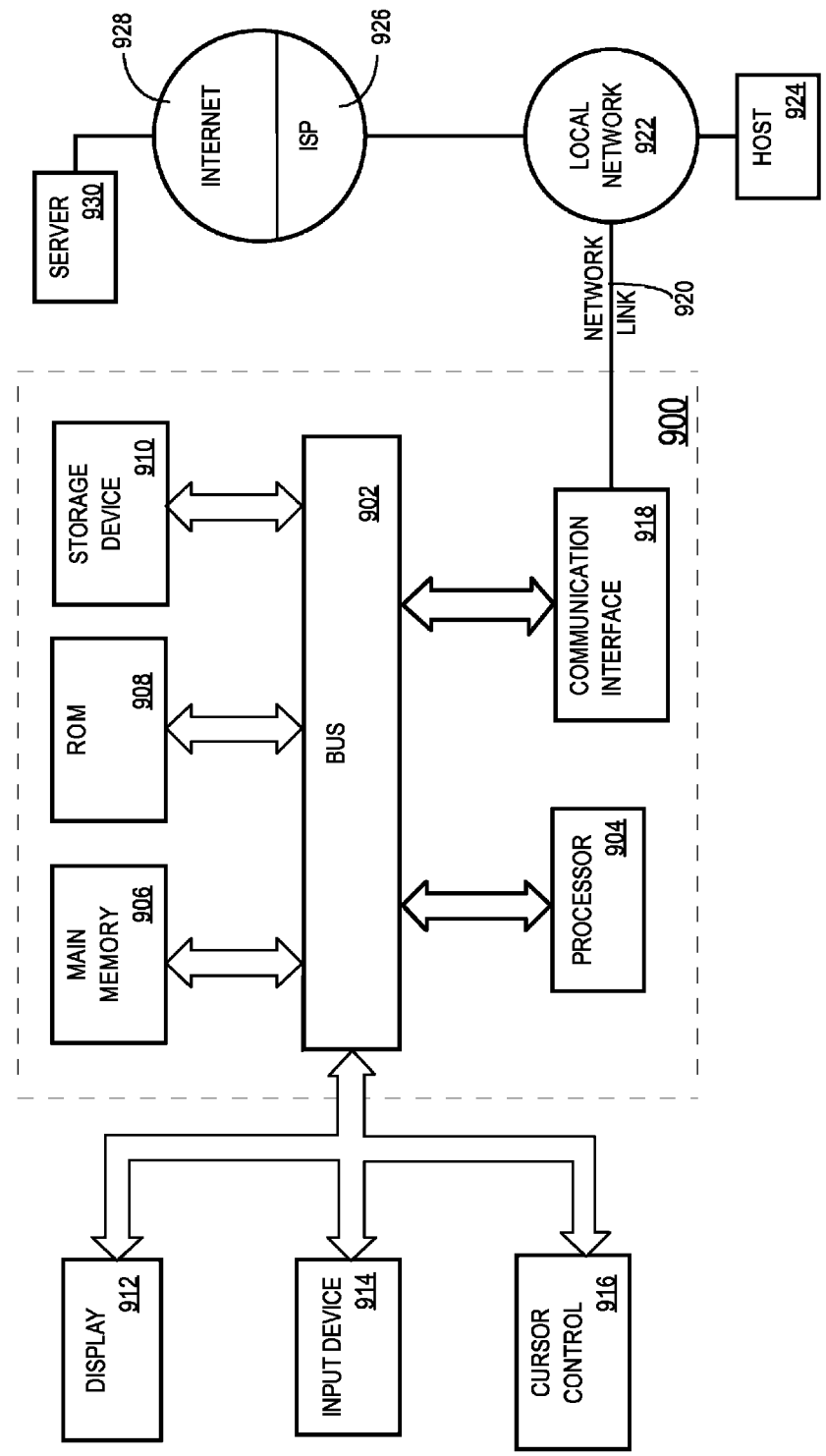
FIG. 9 illustrates a computer system upon which an embodiment may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
displaying a portion of scrollable content in a region of a display that is generated by a computing device, the scrollable content having at least a first section divider, a second section divider, and a first section content between the first section divider and the second section divider; and
scrolling the scrollable content in a first direction until the first section divider reaches a boundary of the region;
placing the first section divider into a stuck mode, whereby the first section divider is rendered fixed when the rest of the scrollable content is scrolled in the first direction while the rest of the scrollable content remains scrollable;
continuing scrolling the remaining scrollable content in the first direction until the section divider reaches a boundary of the first section divider, and whereby the first section content is not displayed on the screen; and
placing the second section divider into a stuck mode, whereby the second section divider is rendered fixed along with the first section divider when the rest of the scrollable content is scrolled in the first direction while the rest of the scrollable content remains scrollable.

2. The method of claim 1 further comprising:
displaying a first control on the first section divider;
receiving an input effective to activate the first control; and
in response to receiving the input, displaying at least a portion of the first section content.

3. The method of claim 2 wherein the displaying at least a portion of the first section content includes automatically scrolling the scrollable content in a second direction that is opposite the first direction until the at least a portion of the section content scrolls into the region.

4. The method of claim 3 further comprising:
ceasing to display the first control in response to receiving the input.

5. The method of claim 4 wherein:
displaying a second control in the first section divider;
receiving an input effective to activate the second control; and
in response to receiving the input effective to activate the second control:
ceasing to display the second control in the section divider of the particular section;
displaying the first control in the section divider of the particular section; and
ceasing to display within the region any portion of the first content.

6. The method of claim 2 further comprising:
removing the second section divider from the stuck mode, whereby the second section divider is scrollable along with the other still scrollable content.

7. The method of claim 1 further comprising:
removing the second section divider from the stuck mode, whereby the second section divider is scrollable along with the other still scrollable content;
scrolling the first section content of in a second direction, opposite the first direction until the boundary of the first section content and the first section divider is reached; and
removing the first section divider from the stuck mode, whereby the first section divider is scrollable along with the other still scrollable content.

8. A computer-readable non-transitory storage medium storing instructions which, when executed by one or more processors, cause the one or more processors to perform:
displaying a portion of scrollable content in a region of a display that is generated by a computing device, the scrollable content having at least a first section divider, a second section divider, and a first section content between the first section divider and the second section divider; and
scrolling the scrollable content in a first direction until the first section divider reaches a boundary of the region;
placing the first section divider into a stuck mode, whereby the first section divider is rendered fixed when the rest of the scrollable content is scrolled in the first direction while the rest of the scrollable content remains scrollable;
continuing scrolling the remaining scrollable content in the first direction until the section divider reaches a boundary of the first section divider, and whereby the first section content is not displayed on the screen; and
placing the second section divider into a stuck mode, whereby the second section divider is rendered fixed along with the first section divider when the rest of the scrollable content is scrolled in the first direction while the rest of the scrollable content remains scrollable.

9. The computer-readable non-transitory storage medium of claim 8 further comprising::
displaying a first control on the first section divider;
receiving an input effective to activate the first control; and
in response to receiving the input, displaying at least a portion of the first section content.

10. The computer-readable non-transitory storage medium of claim 9 wherein the displaying at least a portion of the first section content includes automatically scrolling the scrollable content in a second direction that is opposite the first direction until the at least a portion of the section content scrolls into the region.

11. The computer-readable non-transitory storage medium of claim 10 further comprising:
ceasing to display the first control in response to receiving the input.

12. The computer-readable non-transitory storage medium of claim 11 wherein:
displaying a second control in the first section divider;
receiving an input effective to activate the second control; and
in response to receiving the input effective to activate the second control:
ceasing to display the second control in the section divider of the particular section;
displaying the first control in the section divider of the particular section; and
ceasing to display within the region any portion of the first content.

13. The computer-readable non-transitory storage medium of claim 9 further comprising:
removing the second section divider from the stuck mode, whereby the second section divider is scrollable along with the other still scrollable content.

14. The computer-readable non-transitory storage medium of claim 8 further comprising:
removing the second section divider from the stuck mode, whereby the second section divider is scrollable along with the other still scrollable content;
scrolling the first section content of in a second direction, opposite the first direction until the boundary of the first section content and the first section divider is reached; and
removing the first section divider from the stuck mode, whereby the first section divider is scrollable along with the other still scrollable content.

* * * * *